United States Patent
Sasaki et al.

(10) Patent No.: US 9,432,596 B2
(45) Date of Patent: Aug. 30, 2016

(54) IMAGE PROCESSING APPARATUS AND IMAGE PROCESSING METHOD

(71) Applicant: CANON KABUSHIKI KAISHA, Tokyo (JP)

(72) Inventors: Yoshitaka Sasaki, Kawasaki (JP); Kazuhiro Yahata, Kunitachi (JP)

(73) Assignee: Canon Kabushiki Kaisha, Tokyo (JP)

( * ) Notice: Subject to any disclaimer, the term of this patent is extended or adjusted under 35 U.S.C. 154(b) by 208 days.

(21) Appl. No.: 14/050,820

(22) Filed: Oct. 10, 2013

(65) Prior Publication Data

US 2014/0118581 A1    May 1, 2014

(30) Foreign Application Priority Data

Oct. 25, 2012    (JP) .................................. 2012-235862

(51) Int. Cl.
*H04N 5/357* (2011.01)
*H04N 9/04* (2006.01)
*H04N 5/217* (2011.01)

(52) U.S. Cl.
CPC ............ *H04N 5/357* (2013.01); *H04N 5/2173* (2013.01); *H04N 9/045* (2013.01)

(58) Field of Classification Search
CPC .... H04N 5/357; H04N 5/2173; H04N 9/045; G06T 5/002; G06T 5/10; G06T 2207/20012; G06T 2207/20192; G06T 2207/20016
See application file for complete search history.

(56) References Cited

U.S. PATENT DOCUMENTS

| 5,327,246 A | * | 7/1994 | Suzuki | H04N 5/3675 348/246 |
| 7,199,824 B2 | * | 4/2007 | Chang | H04N 5/2176 348/246 |
| 7,388,609 B2 | * | 6/2008 | Pinto | H04N 9/045 348/245 |
| 7,656,442 B2 | * | 2/2010 | Tsuruoka | H04N 5/367 348/222.1 |
| 7,916,191 B2 | * | 3/2011 | Kiba | H04N 5/3675 348/222.1 |
| 8,004,588 B2 | * | 8/2011 | Lukac | H04N 9/045 348/252 |

(Continued)

FOREIGN PATENT DOCUMENTS

| JP | 2005-303731 A | 10/2005 |
| JP | 2007-536662 A | 12/2007 |

(Continued)

OTHER PUBLICATIONS

Office Action in Japanese Patent Application No. 2012-235862, dated Jun. 21, 2016.

*Primary Examiner* — Aung S Moe
(74) *Attorney, Agent, or Firm* — Fitzpatrick, Cella, Harper & Scinto

(57) ABSTRACT

Noise in RAW image data is reduced by determining parameters including pixels used as a target area and reference pixels in the RAW image data, based on color filter information for the RAW image data. The RAW image data is corrected based on the parameters thus determined.

18 Claims, 16 Drawing Sheets

(56) References Cited

U.S. PATENT DOCUMENTS

| | | | | |
|---|---|---|---|---|
| 8,019,174 B2* | 9/2011 | Tsuruoka | ............... | G06T 7/408 382/162 |
| 8,199,223 B2 | 6/2012 | Sasaki | | |
| 8,253,825 B2 | 8/2012 | Morel et al. | | |
| 8,300,121 B2 | 10/2012 | Yahata | | |
| 8,310,566 B2* | 11/2012 | Tsuruoka | ............... | G06T 5/002 348/222.1 |
| 8,427,559 B2 | 4/2013 | Morel et al. | | |
| 8,885,965 B2* | 11/2014 | Yang | ............... | G06T 5/002 382/260 |
| 8,970,742 B2* | 3/2015 | Horikawa | ............. | H04N 5/367 348/241 |
| 9,025,903 B2* | 5/2015 | Wada | ............... | G06T 5/002 382/254 |
| 2005/0259886 A1* | 11/2005 | Shan | ............... | G06T 5/002 382/260 |
| 2006/0066736 A1* | 3/2006 | Tsuruoka | ............... | H04N 5/367 348/241 |
| 2007/0132864 A1* | 6/2007 | Tsuruoka | ............... | H04N 5/357 348/241 |
| 2008/0266432 A1* | 10/2008 | Tsuruoka | ............... | G06T 5/002 348/294 |
| 2008/0278609 A1* | 11/2008 | Otsuki | ............... | H04N 5/2178 348/247 |
| 2009/0016638 A1* | 1/2009 | Nagatsuma | ............. | H04N 9/07 382/275 |
| 2009/0087121 A1* | 4/2009 | Han | ............... | G06T 5/002 382/266 |
| 2009/0110285 A1* | 4/2009 | Elad | ............... | G06T 3/4053 382/190 |
| 2009/0244333 A1* | 10/2009 | Lukac | ............... | H04N 9/045 348/280 |
| 2010/0002957 A1* | 1/2010 | Lukac | ............... | G06T 5/003 382/293 |
| 2010/0013963 A1* | 1/2010 | Jannard | ............... | H04N 5/3675 348/242 |
| 2010/0039563 A1* | 2/2010 | Lukac | ............... | G06T 3/4015 348/663 |
| 2010/0053351 A1* | 3/2010 | Lukac | ............... | H04N 9/045 348/222.1 |
| 2010/0061625 A1* | 3/2010 | Lukac | ............... | H04N 9/045 382/162 |
| 2010/0141804 A1* | 6/2010 | Morel | ............... | G06T 5/50 348/241 |
| 2010/0245632 A1* | 9/2010 | Suzuki | ............... | H04N 5/357 348/241 |
| 2011/0063517 A1* | 3/2011 | Luo | ............... | H04N 9/78 348/663 |
| 2011/0069904 A1* | 3/2011 | Yang | ............... | G06T 5/002 382/275 |
| 2011/0081086 A1* | 4/2011 | Chien | ............... | G06T 5/002 382/195 |
| 2011/0194763 A1 | 8/2011 | Moon et al. | | |
| 2012/0099008 A1* | 4/2012 | Horikawa | ............. | H04N 5/367 348/246 |
| 2012/0105728 A1* | 5/2012 | Liu | ............... | H04N 5/213 348/607 |
| 2012/0121203 A1* | 5/2012 | Hara | ............... | G06T 5/002 382/255 |
| 2012/0148108 A1 | 6/2012 | Yahata | | |
| 2012/0218447 A1* | 8/2012 | Furuya | ............... | H04N 5/3675 348/246 |
| 2012/0268623 A1 | 10/2012 | Morel et al. | | |
| 2012/0281923 A1* | 11/2012 | Irani | ............... | G06K 9/6223 382/218 |
| 2012/0288194 A1* | 11/2012 | Nakamura | ........... | H04N 1/4092 382/167 |
| 2013/0142441 A1* | 6/2013 | Goto | ............... | G06T 5/20 382/218 |
| 2013/0148141 A1* | 6/2013 | Morita | ............... | H04N 1/58 358/1.9 |
| 2013/0208152 A1* | 8/2013 | Hsu | ............... | H04N 5/367 348/246 |
| 2013/0235208 A1* | 9/2013 | Hirano | ............... | G06T 7/20 348/157 |
| 2013/0329999 A1* | 12/2013 | Imagawa | ............... | G06K 9/40 382/167 |
| 2014/0092443 A1* | 4/2014 | Hasegawa | ......... | H04N 1/40093 358/3.24 |
| 2014/0118578 A1* | 5/2014 | Sasaki | ............... | G06T 5/20 348/241 |
| 2014/0118580 A1* | 5/2014 | Ono | ............... | H04N 9/045 348/242 |
| 2014/0118581 A1* | 5/2014 | Sasaki | ............... | H04N 5/357 348/242 |
| 2014/0226905 A1* | 8/2014 | Yahata | ............... | G06T 5/002 382/194 |
| 2014/0375850 A1* | 12/2014 | Shih | ............... | H04N 5/357 348/281 |
| 2015/0085188 A1* | 3/2015 | Shirani | ............... | H04N 7/012 348/441 |
| 2015/0287171 A1* | 10/2015 | Hiasa | ............... | G06T 5/002 382/195 |

FOREIGN PATENT DOCUMENTS

| | | |
|---|---|---|
| JP | 2010-245977 A | 10/2010 |
| JP | 2011-039675 A | 2/2011 |

* cited by examiner

| G | R | G | R | G | R | G | R | G | R |
|---|---|---|---|---|---|---|---|---|---|
| B | G | B | G | B | G | B | G | B | G |
| G | R | G | R | G | R | G | R | G | R |
| B | G | B | G | B | G | B | G | B | G |
| G | R | G | R | G | R | G | R | G | R |
| B | G | B | G | B | G | B | G | B | G |
| G | R | G | R | G | R | G | R | G | R |
| B | G | B | G | B | G | B | G | B | G |
| G | R | G | R | G | R | G | R | G | R |
| B | G | B | G | B | G | B | G | B | G |

IMAGE PROCESSING APPARATUS AND IMAGE PROCESSING METHOD

BACKGROUND OF THE INVENTION

1. Field of the Invention

The present invention relates to an image processing apparatus and an image processing method for reducing noise contained in image data.

2. Description of the Related Art

Digital still cameras and digital video cameras have come into widespread general use. These digital image capturing devices generate digital image data by converting, into digital signals, light received by a photoelectric conversion element (image capturing element), such as a CCD or CMOS sensor. To obtain image data representing a color image, color filters having different transmittances depending on the wavelength of light are arranged regularly in front of the image capturing element. A digital image capturing device generates color signals based on the difference among the amounts of light transmitted through the color filters. Thus, image data recorded by the digital image capturing device (hereinafter referred to as RAW image data) is recorded in accordance with the placement of the color filters. After being recorded, the RAW image data is subjected to a series of image processing operations, such as white balance correction and pixel interpolation. As a result, image data representing a general color image, such as an RGB image, is generated.

In the process of generating digital image data, noise such as dark-current noise, thermal noise, and shot noise is generated by the characteristics of the image capturing element and circuit, and contaminates the digital image data. The noise is more noticeable now than before since image capturing elements developed in recent years have been reduced in size, have more pixels, and therefore have a super-high pixel pitch. The noise is generated markedly and is a strong factor in image degradation, especially in a case, for example, where ISO sensitivity is increased. For this reason, to obtain a high-quality image by reducing such noise, noise contaminating the RAW image data needs to be reduced.

In a conventionally-known method, noise is reduced by using a low-pass filter which allows only a signal component at or below a noise frequency to pass therethrough. However, this method blurs not only the noise but also the edge, and therefore makes it difficult to obtain a high-quality image. Thus, a number of methods have been proposed for reducing noise adaptively by sorting out, in some way, information on the noise and information on the edge.

General adaptive noise reduction reduces noise in the following manner. Specifically, to reduce noise in a target pixel, multiple pixels near the target pixel are selected as reference pixels, and the value of the target pixel is replaced with an appropriate weighted average of the reference pixels.

As one of methods for the adaptive noise reduction, there is a technique which achieves noise reduction by defining an area including a target pixel (a target area), obtaining the similarity between the target pixel and its reference pixels in a unit of the area, and calculating a weighted average according to the similarity (Japanese Patent Laid-Open No. 2007-536662 and Japanese Patent Laid-Open No. 2011-39675).

In the conventional methods, the target area and the reference pixels can be set freely on a general color image such as an RGB image or an image such as a grayscale image having signal values of the same level within the image. However, in a case of an image like a RAW image in which pixels have signal values of different levels depending on the color filter, there is a problem that noise cannot be reduced by simply setting the target area and the reference pixels. On the other hand, in a case where the conventional methods are used on a color image generated from a RAW image, color image data needs to be generated by performing pixel interpolation and the like on RAW image data which still contains noise, which contributes to image quality degradation.

SUMMARY OF THE INVENTION

The present invention provides an image processing apparatus and an image processing method capable of reducing noise in a RAW image.

An image processing apparatus according to the present invention has a determination unit configured to determine, based on color filter array information of an image capturing device, a target pixel group and a reference pixel group in image data. The target pixel group includes a target pixel, and the reference pixel group including a reference pixel. The apparatus also includes a generation unit configured to generate corrected image data by correcting a pixel value of each target pixel in the image, based on a similarity between pixel values of the target pixel group determined by the determination unit and pixel values of the reference pixel group determined by the determination unit.

The present invention accomplishes noise reduction even for image data, such as a RAW image, having signal values of different levels on a pixel basis according to color filters. Thus, high-quality image data can be generated from even image data captured by a digital image capturing device having any selected color filter array.

Further features of the present invention will become apparent from the following description of exemplary embodiments with reference to the attached drawings.

BRIEF DESCRIPTION OF THE DRAWINGS

FIG. 4 is a schematic diagram showing an example of color filter information according to Embodiment 1 of the present invention;

FIGS. 6A to 6C are schematic diagrams each illustrating a result of selecting color from the color filter information, according to Embodiment 1 of the present invention;

FIGS. 7A to 7D are schematic diagrams showing an example of reference pixels of their colors, according to Embodiment 1 of the present invention;

FIGS. 8A to 8F are schematic diagrams showing an example of target areas of their colors, according to Embodiment 1 of the present invention;

FIGS. 11A to 11H are schematic diagrams each illustrating a method of determining reference pixel candidates according to Embodiment 2 of the present invention;

FIG. 12 is a schematic diagram illustrating an example of color filter information according to Embodiment 3 of the present invention;

FIGS. 14A to 14D are schematic diagrams illustrating a method of determining reference areas for reference pixels, according to Embodiment 3 of the present invention;

DESCRIPTION OF THE EMBODIMENTS

Figure 1:
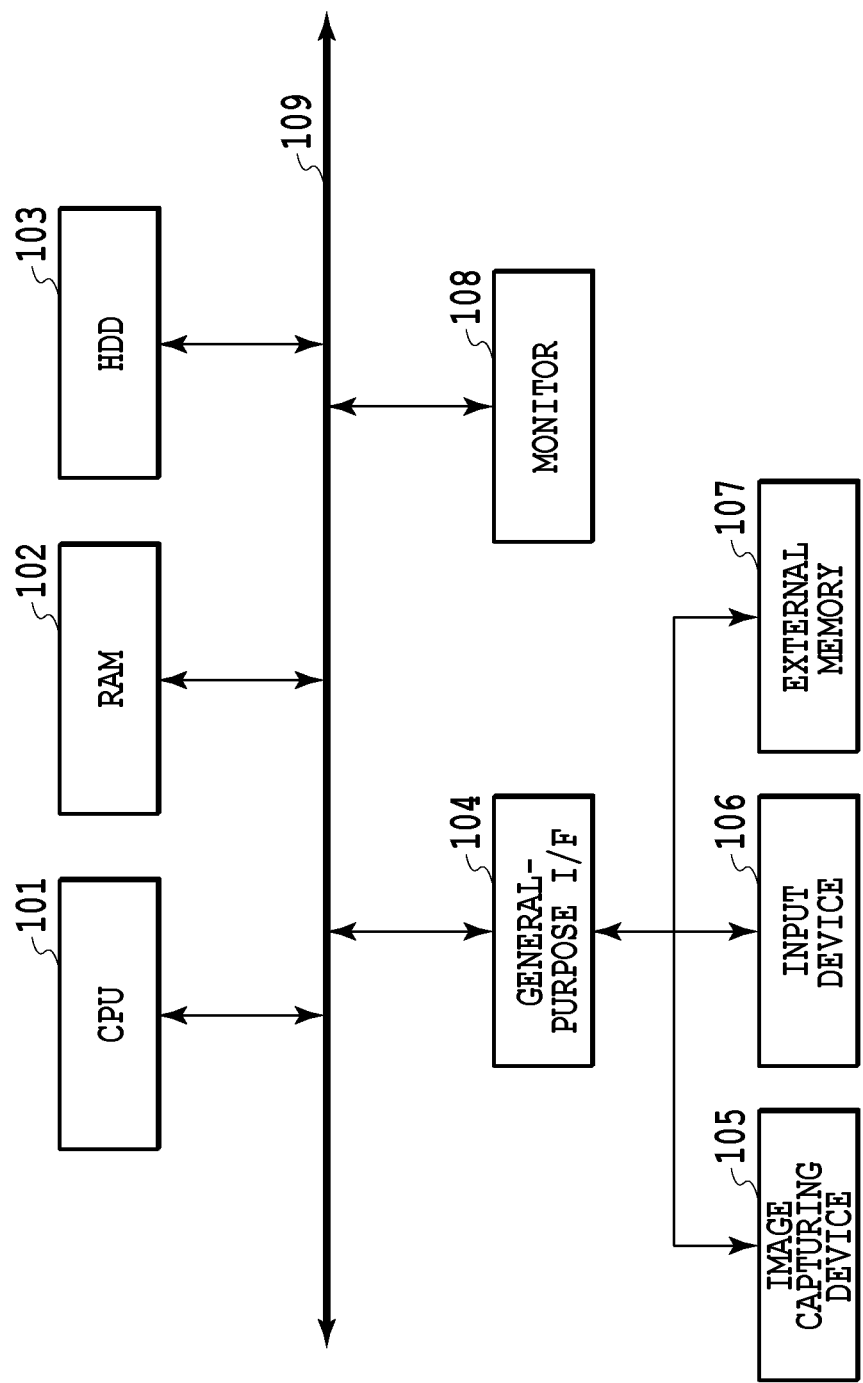
FIG. 1 is a block diagram showing an example of the hardware configuration of an image processing apparatus according to Embodiment 1 of the present invention.

Embodiments of the present invention are described below with reference to the drawings attached hereto. Note that configurations shown in the embodiments below are mere examples, and the present invention is not limited to the configurations shown in the drawings.

Embodiment 1

With reference to FIG. 1, the configuration of an image processing apparatus of this embodiment is described.

In FIG. 1, the image processing apparatus includes a CPU 101, a RAM 102, an HDD 103, a general-purpose interface (I/F) 104, a monitor 108, and a main bus 109. The general-purpose I/F 104 connects an image capturing device 105 such as a camera, an input device 106 such as a mouse and a keyboard, and an external memory 107 such as a memory card, to the main bus 109.

A description is given below of various kinds of processing implemented by the CPU 101 operating various types of software (computer programs) stored in the HDD 103.

First, the CPU 101 activates an image processing application stored in the HDD 103, deploys the application on the RAM 102, and displays a user interface (UI) on the monitor 108. Next, various types of data stored in the HDD 103 and the external memory 107, RAW image data captured by the image capturing device 105, commands from the input device 106, and the like are transferred to the RAM 102. Further, in accordance with processing in the image processing application, the data stored in the RAM 102 are subjected to various computations based on commands from the CPU 101. Results of the computations are displayed on the monitor 108 and/or stored in the HDD 103 or the external memory 107. Note that RAW image data stored in the HDD 103 or the external memory 107 may be transferred to the RAM 102. Moreover, RAW image data transmitted from a server via a network (not shown) may be transferred to the RAM 102.

A detailed description is given of processing, performed by the image processing apparatus having the above configuration based on commands from the CPU 101, for generating noise-reduced image data by inputting image data to the image processing application and reducing noise therein and for outputting the noise-reduced image data.

(Non-Local Means)

First, a description is given of noise reduction processing described in this embodiment. In this embodiment, a method called Non-local Means (NLM) is used. In this method, noise is reduced by adaptively weighting pixel values of reference pixels around a target pixel, including the target pixel (noise reduction target), and replacing the pixel value of the target pixel with a weighted average of the pixel values of the reference pixels. A pixel value $I_{new}$ of the target pixel after the noise reduction processing is obtained by the following formula.

$$I_{new} = \frac{\sum_{j=1}^{N_s} w_j \times I_j}{\sum_{j=1}^{N_s} w_j} \qquad (1)$$

where $N_s$ is the number of reference pixels, $I_j$ (j=1 to $N_s$) is a pixel value of a reference pixel, and $w_j$ (j=1 to $N_s$) is a weight for a reference pixel.

Next, how to calculate the weights for the reference pixels is described with reference to FIGS. 15A, 15B, and FIG. 16.

Figure 15A:
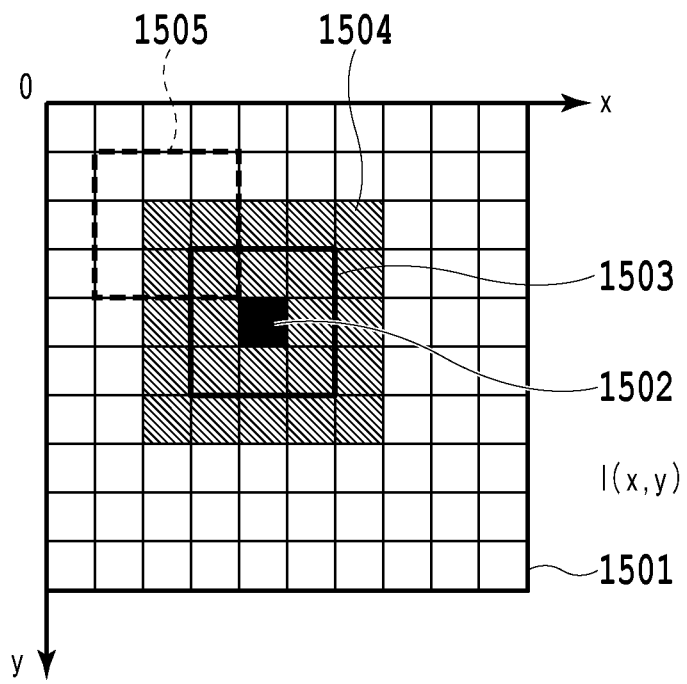
FIGS. 15A and 15B are schematic diagrams illustrating a noise reduction method according to Embodiment 1 of the present invention.
Figure 15B:
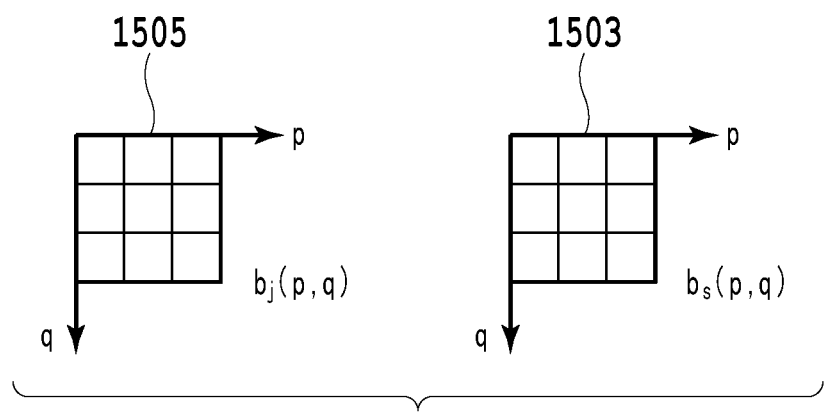
Figure 16:
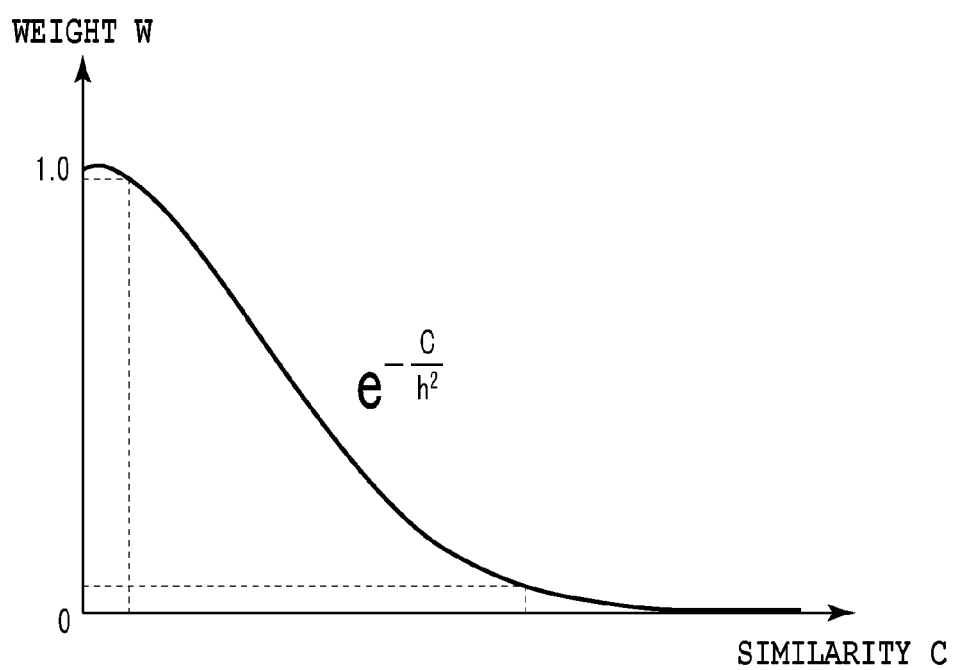
FIG. 16 is a schematic diagram illustrating a function for calculating weights for reference pixels according to Embodiment 1 of the present invention.

FIG. 15A shows image data 1501 as an example, in which a pixel value of each pixel is represented by I (x, y) with the upper left pixel being the origin. Reference numeral 1502 denotes a target pixel whose pixel value is I (4,4). Reference numeral 1503 is a target area which is a square having 3×3 pixels with the target pixel 1502 (noise reduction target) located at the center of the square. Reference numeral 1504 denotes reference pixels which are in a square area of 5×5 pixels ($N_s$=25) including the target pixel 1502. Reference numeral 1505 is a reference area of a reference pixel I (2,2) and is a square area of 3×3 pixels having the reference pixel I (2,2) at its center and having the same size as the target area. Although each reference pixel has its reference area, only the reference area of the reference pixel I (2,2) is shown in FIG. 15A.

To obtain a weight for the reference pixel I (2,2), first, the reference area 1505 of the reference pixel I (2,2) is compared with the target area 1503 to calculate their similarity. Note that the similarity may be obtained by any desired method. For instance, as shown in FIG. 15B, each pixel in the target area 1503 is expressed as $b_s(p,q)$, and each pixel in the reference area 1505 is expressed as $b_j(p,q)$ (j=1 to $N_s$). Then, a difference between a pixel in the target area 1503 and a pixel in the reference area 1505 which pixels spatially correspond to each other is obtained as a similarity $C_j$ by the following formula.

$$C_j = \sum_p \sum_q (b_j(p, q) - b_s(p, q))^2 \qquad (2)$$

The smaller the value of the similarity $C_j$ is, the higher the similarity is between the target area and the reference area. Thus, a weight is determined according to the similarity. As shown by a function in FIG. 16, the weight may be determined such that the lower the similarity Cj, the larger the weight and that the higher the similarity Cj, the smaller the weight. For example, the weight is determined by the following formula.

$$w_j = \exp\left(-\frac{C_j}{h^2}\right) \qquad (3)$$

In the above formula, h is a variable controlling the magnitude of the weight, and increasing h makes the noise reduction effect higher, but blurs the edge.

By sequentially comparing the target area 1503 with the reference area of each of the reference pixels, a weight for each of the reference pixels is obtained.

Note that the noise reduction processing in this embodiment only has to be processing by which the weight for each reference pixel is determined based on a similarity between the target area and the reference area of the reference pixel, and the similarity or weight calculation methods are not limited to what is described herein.

(Logical Configuration of the Image Processing Apparatus)

Image processing in this embodiment is described below with reference to FIGS. 2 and 3.

Figure 2:
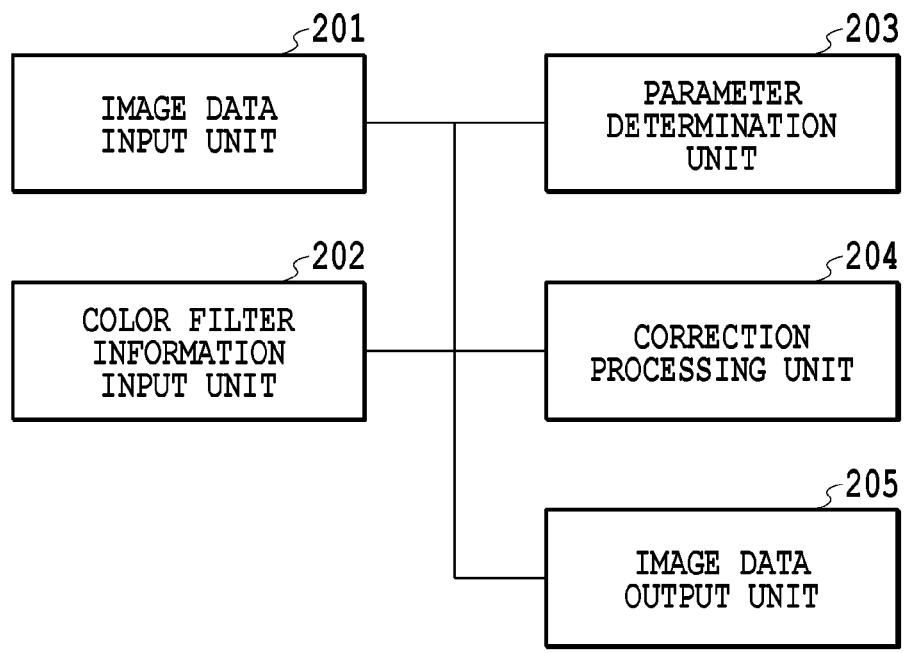
FIG. 2 is a block diagram showing an example of the logical configuration of the image processing apparatus according to Embodiment 1 of the present invention.

FIG. 2 is a schematic diagram showing the logical configuration of the image processing apparatus of this embodiment. In FIG. 2, an image data input unit 201 is configured to input RAW image data to the image processing apparatus. The RAW image data is inputted from the image capturing device 105, the HDD 103, or the external memory 107 based on a command from the CPU 101. RAW image data captured by the image capturing device 105 and stored in a storage device such as the HDD 103 may be inputted, of course.

A color filter information input unit 202 is configured to input color filter information to the image processing apparatus, the color filter information corresponding to the RAW image data inputted by the image data input unit 201. The color filter information is inputted from the image capturing device 105, the HDD 103, or the external memory 107 based on a command from the CPU 101. Alternatively, the color filter information may be directly designated on the user interface (UI) by use of the input device 106 such as a keyboard and mouse. The color filter information will be described in detail later.

A parameter determination unit 203 is configured to obtain the color filter information and determine parameters used for the noise reduction processing, based on commands from the CPU 101. The parameters thus determined are stored in the RAM 102. How the parameters are determined will be described in detail later.

A correction processing unit 204 is configured to, based on commands from the CPU 101, obtain the inputted RAW image data and the parameters, perform the noise reduction processing on the inputted RAW image data, and thereby generate corrected image data. The corrected image data thus generated are stored in the RAM 102.

The image data output unit 205 is configured to output the corrected image data generated by the correction processing unit 204 to the monitor 108, the HDD 103, and/or the like. Note that the output destination is not limited to the above, and the corrected image data may be outputted to, for example, the external memory 107 connected to the general-purpose I/F 104, an external server (not shown), or a printer or the like additionally connected to the image processing apparatus.

(Main Processing Flow)

With reference to a flowchart in FIG. 3, details are given below of each processing performed in the logical configuration of the image processing apparatus described in FIG. 2.

In Step S301, the image data input unit 201 inputs RAW image data.

In Step S302, the color filter information input unit 202 inputs color filter information corresponding to the RAW image data inputted in Step 301. An example of the color filter information inputted in this step is described with reference to FIG. 4. FIG. 4 shows a Bayer array in which rows each having alternating green (G) and red (R) pixels and rows each having alternating blue (B) and green (G) pixels are arrayed alternately. An image capturing device configured to generate a color image using an image capturing element obtains color information by receiving light through such color filters. The following description assumes that the Bayer array is inputted as the color filter information. Note, however, that this embodiment is not limited to an image captured with the Bayer array, but is applicable to an image captured with any selected color filter array. As shown in FIG. 4, the color filter information may be information on placement of pixels according to their colors. Thus, Step S302 may also be called placement information input processing.

In Step S303, based on the color filter information inputted in Step S302, the parameter determination unit 203 determines parameters used in processing for correcting the RAW image data inputted in Step S301. The parameters determined in this step include at least reference pixels and pixels used as a target area. In other words, the parameters determined in this step are used in deriving a weight for each reference pixel in noise reduction processing using the Non-local Means method described earlier. Details of a method of determining the parameters will be given later.

In Step S304, the correction processing unit 204 generates corrected image data by performing the noise reduction processing on the RAW image data inputted in Step S301, by referring to the parameters determined in the Step S302. Details of the processing for correcting the RAW image data will be given later.

In Step S305, the image data output unit 205 outputs the corrected image data generated in Step S304.

(Parameter Determination Processing)

Figure 5:
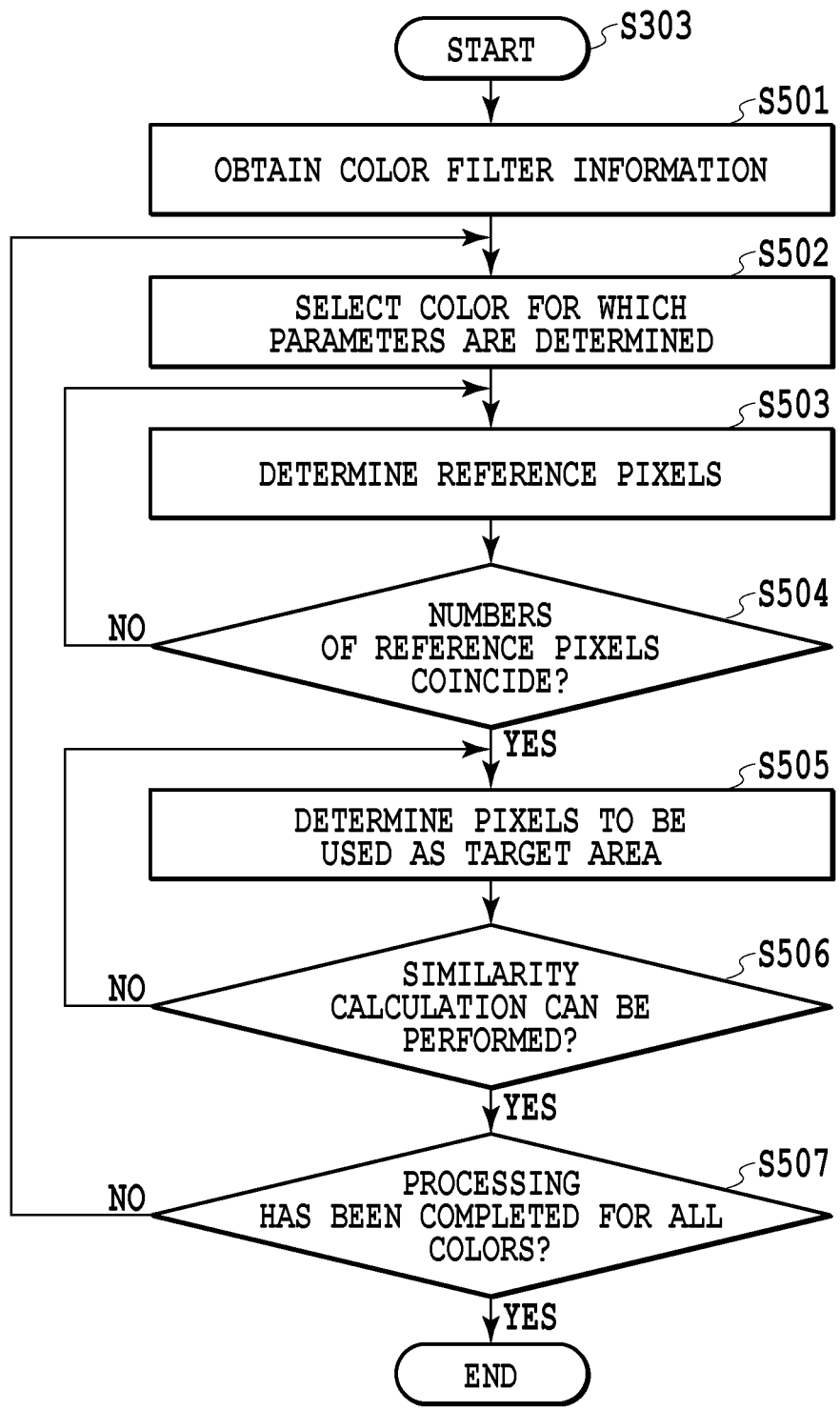
FIG. 5 is a flowchart diagram showing an example of a flow of parameter determination processing according to Embodiment 1 of the present invention.

With reference to a flowchart in FIG. 5, details are given below of the parameter determination processing performed in Step S303 described in FIG. 3.

In Step S501, the parameter determination unit 203 obtains the color filter information inputted in Step S302. Note that the color filter information obtained here in this embodiment is information regarding a Bayer array in which colors are regularly placed.

Figures 6A, 6B, 6C:
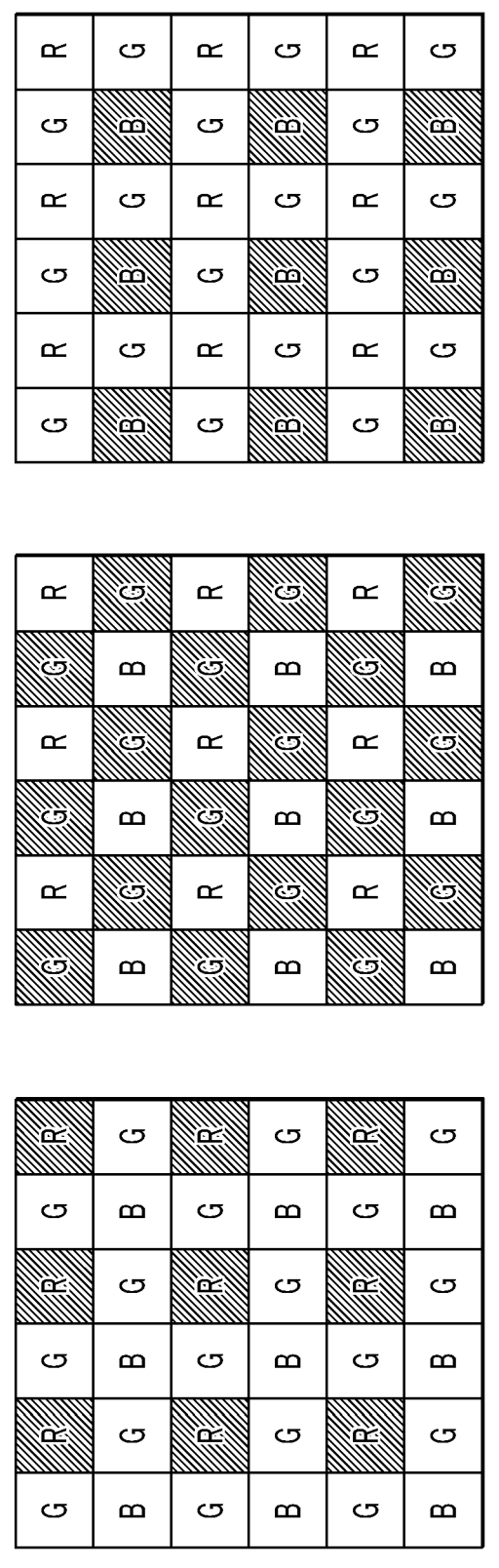

In Step S502, from the color filter information obtained in Step S501, the parameter determination unit 203 selects color for which the parameters are to be determined. With reference to FIGS. 6A to 6C, a description is given of colors obtained from the color filter information. In FIGS. 6A to 6C, respective colors are selected from the Bayer array obtained as the color filter information, and selected pixels are those in gray. Thus, red is selected in FIG. 6A, green is selected in FIG. 6B, and blue is selected in FIG. 6C. As shown in the drawings, the placement of pixels obtained from the color filter information is different for each color. Thus, to apply the noise reduction processing described in this embodiment, the parameters need to be set appropriately based on the color filter information.

In Step S503, the parameter determination unit 203 determines, as the parameters, reference pixels (a pixel group) used for the correction processing on the pixels of the color selected in Step S502. Normally, a color filter of a certain color has a different light transmittance from a color filter of another color, and therefore the amount of light received by an image capturing element is different depending on the color filters even in a case where the same amount of light enters the image capturing element. Thus, the signal level in the RAW image is different for each color, and the signal levels of different colors cannot be compared with each other. For this reason, each reference pixel used in performing the noise reduction processing on a certain target pixel needs to be a pixel of the same color as the target pixel. To put it the other way around, all the pixels in the RAW image data are usable for the correction processing as long as they are of the same color as the target pixel. Hence, pixels in the entire image having the same color may be determined as reference pixels to be used as the parameters. However, having a large number of reference pixels requires an enormous amount of time for the processing, and therefore lacks practicality. Thus, the reference pixels determined as the parameters may be limited to pixels near the target pixel. For instance, pixels within a block of a predetermined range from a target pixel at the center may be determined as reference pixels used as the parameters. In this case, the reference pixels determined in Step S503 are each associated with a value representing the predetermined range above (e.g., 9×9).

In Step S504, the parameter determination unit 203 determines whether the number of the reference pixels determined in the Step S503 coincides with the numbers of reference pixels of the other colors. The parameter determination unit 203 proceeds to Step S505 in a case where the numbers of the reference pixels coincide, or proceeds to Step S503 to continue the processing in a case where they do not coincide. Note that the parameter determination unit 203 proceeds directly to Step S505 at an initial process in the flow where a first color is selected.

Figures 7A, 7B, 7C, 7D:
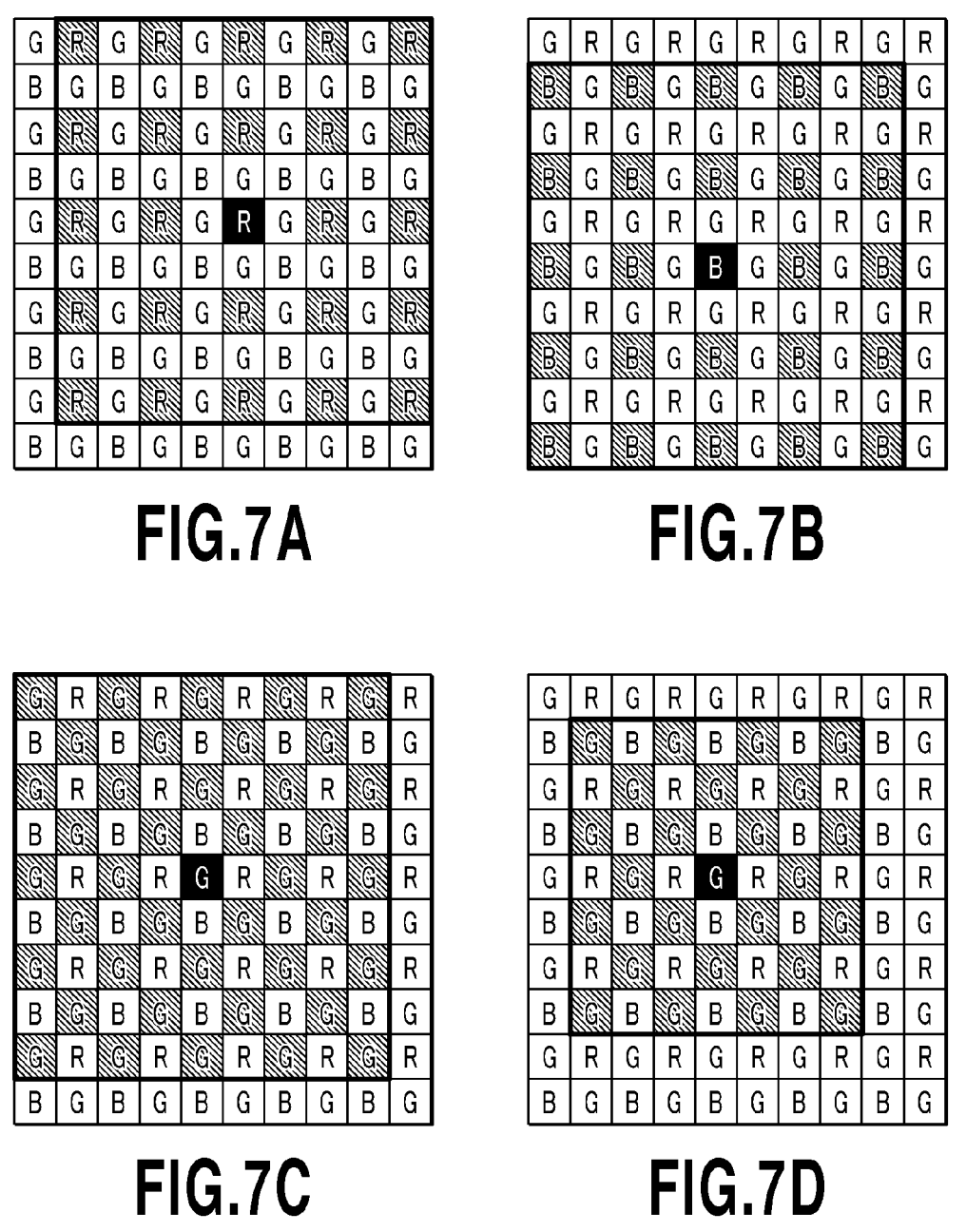

With reference to FIGS. 7A to 7D, a method for determining the reference pixels in Steps S503 and S504 is described. In Step S503, FIGS. 7A to 7C each show an example of reference pixels of each color determined in a case where the color filters are of the Bayer array. FIG. 7A shows a case where red is selected in Step S502, FIG. 7B shows a case of blue, and FIG. 7C shows a case of green. In each of FIGS. 7A to 7C, a pixel in black is a target pixel, and pixels in gray are reference pixels for the target pixel. These drawings each show an example where pixels having the same color as the target pixel and being located within a 9×9 pixel range from the target pixel at the center are determined as reference pixels. In Step S503, reference pixels can thus be determined to only ones located near the target pixel.

The number of reference pixels in FIGS. 7A and 7B is twenty five, while that in FIG. 7C is forty one (a target pixel is also included and counted as the reference pixels). In the noise reduction processing, normally, the more the reference pixels, the higher the noise reduction effect, and the less the reference pixels, the lower the noise reduction effect. Thus, in the above example, the noise reduction effect is high only for green, and therefore noise in red or blue might be noticeable in an image after the correction processing. To avoid this, in Step S504, the parameter determination unit 203 determines whether the number of the reference pixels coincides with the numbers of reference pixels of the other colors, and in a case where they do not coincide, determines the reference pixels again in Step S503. For instance, assume that the reference pixels corresponding to red and those corresponding to blue have already been determined as shown in FIGS. 7A and 7B, and reference pixels corresponding to green are to be determined now. In such a case, in a case where the reference pixels are determined in Step S503 as shown in FIG. 7C, the determination in Step S504 results in NO. Then, as shown in FIG. 7D, twenty-five pixels within a 7×7 pixel range can be determined as reference pixels for green.

Note that how to select the reference pixels is not limited to what is described above, and any number of reference pixels and any range for selecting the reference pixels can be set. For instance, the range for selecting the reference pixels may be set according to a condition such as a distance from a target pixel being at or below a desired threshold. In this case, each reference pixel determined in Step S503 may be associated with a value representing the distance from the target pixel. In addition, although the numbers of the reference pixels of red, blue, and green coincide with each other in the example shown herein, there are some cases where they cannot necessarily be made to coincide with each other, depending on the placement of the color filters or how the range for selecting the reference pixels is selected. In those cases, the reference pixels may be determined so that the numbers of reference pixels of the respective colors may substantially coincide with each other, based on the color filter information.

In Step S505, the parameter determination unit 203 determines, as parameters, pixels (a pixel group) to be used as a target area, which is used in the correction processing for the pixels of the color selected in Step S502.

In Step S506, the parameter determination unit 203 determines whether similarities can be calculated or not from the pixels determined in Step S505 as being used as the target area. The parameter determination unit 203 proceeds to Step S507 in a case where the similarities can be calculated, or proceeds to Step S505 to continue the processing in a case where the similarities cannot be calculated.

Figures 8A, 8B, 8C, 8D, 8E, 8F:
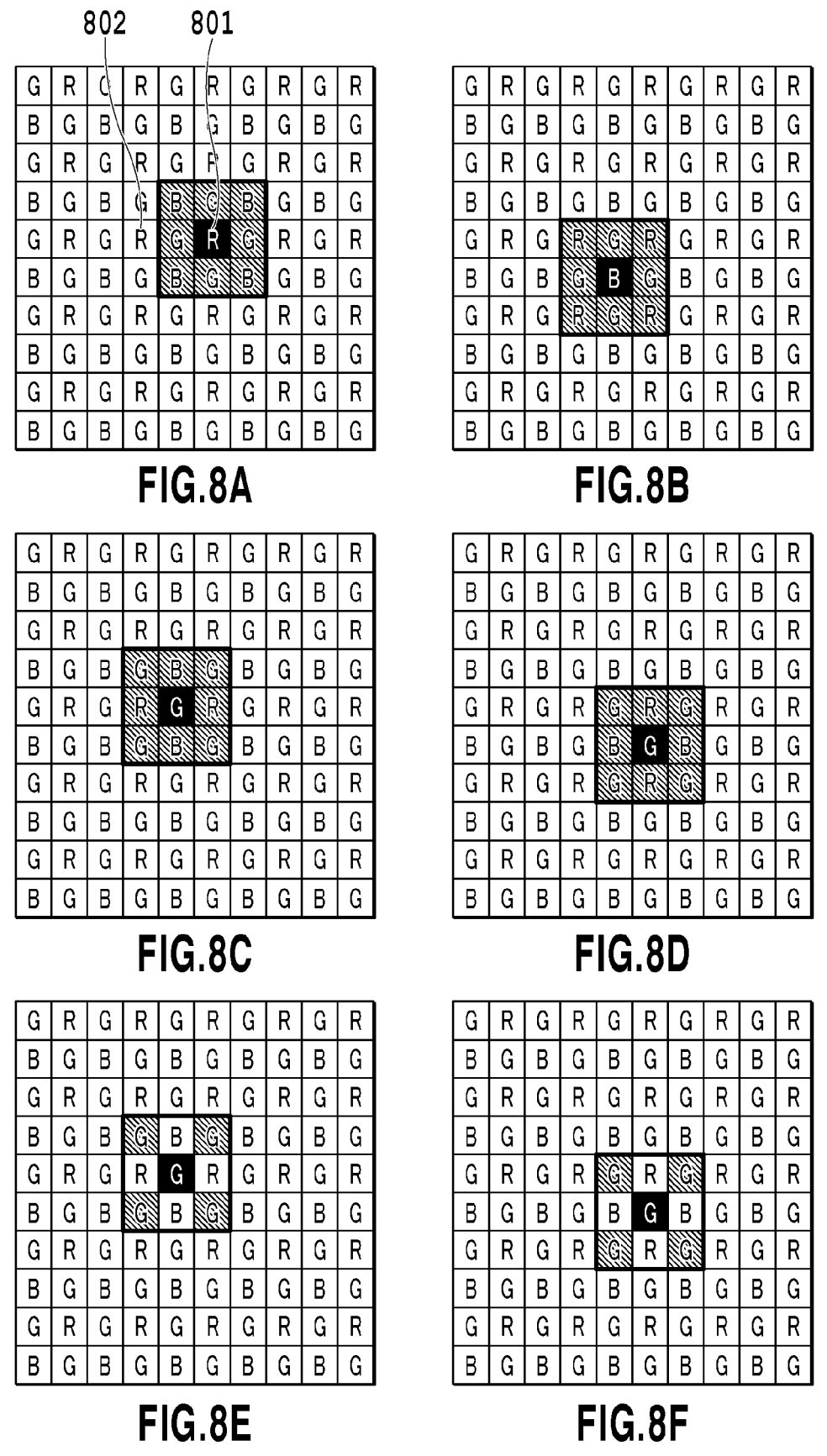

With reference to FIGS. 8A to 8F, a description is given of a method for determining the target area in Steps S505 and S506. FIGS. 8A to 8F each show an example of a target area or a reference area for each color in a case where the color filters have the Bayer array. FIGS. 8A to 8C show pixels used as a target area in cases where red is selected, blue is selected, and green is selected, respectively. In addition, a pixel in black is a target pixel, and pixels in gray are pixels determined as a target area which is in a 3×3 pixel range from the target pixel at the center. In Step S505, in this way, any pixels having the target pixel at their center can be determined as pixels used as a target area.

The target area can be changed depending on the target pixel. However, since the color filters have the Bayer array in this embodiment, pixels used as a target area (i.e., pixels in a predetermined range from a target pixel at the center) can be common in RAW image data. For example, in FIG. 8A, the placement of pixels in a target area of a target pixel 801 is the same as that in a target area of a target pixel 802. Hence, in Step S505, pixels determined as being used as a target area (i.e., pixels in a predetermined range from a target pixel at the center) can be common in the RAW image data.

In order to obtain a similarity between the target area and each reference area based on Formula (2), the placement of pixels of each color in the target area needs to coincide with that in the reference area. In the cases shown in FIGS. 8A and 8B, the placement of the pixels of each color in the target area coincides with that in each reference area. However, in a case where a target area of a green pixel is determined as shown in FIG. 8C, the target area shown in FIG. 8C has a placement of pixels of each color different from a reference area of a green reference pixel in FIG. 8D, the reference area being shown in gray, the reference pixel being shown in black in FIG. 8D. Hence, a similarity between them cannot be obtained. Thus, in Step S506, the parameter determination unit 203 determines whether or not the similarity between the target area and the reference area of each of the reference pixels determined in Step S503 can be calculated by using the pixels determined in Step S505 as being used as the target area. In a case where the similarity cannot be calculated, pixels to be used as a target area are selected anew in Step S505. For instance, as in FIG. 8E, pixels to be used as a target area are determined, excluding pixels of the other colors. To be more specific, pixels in the target area excluding pixels on the top, bottom, left, and right of the target pixel are determined as pixels to be used as the target area. Determining the pixels to be used as the target area in this way makes the placement of the pixels in the target area coincide with that in the other reference areas of green pixels, as shown in FIG. 8F, and therefore allows the similarities to be calculated. Note that a method of determining the target area is not limited to the above, and any method may be employed as long as the similarities can be calculated.

In Step S507, the parameter determination unit 203 determines whether or not the parameter determination has been completed for all the colors included in the color filter information obtained in Step S501. The parameter determination unit 203 ends the parameter determination processing in a case where the parameter determination has been completed for all the colors, or proceeds to Step S502 to continue the processing in a case where the parameter determination has not been completed yet.

(Correction Processing)

Figure 9:
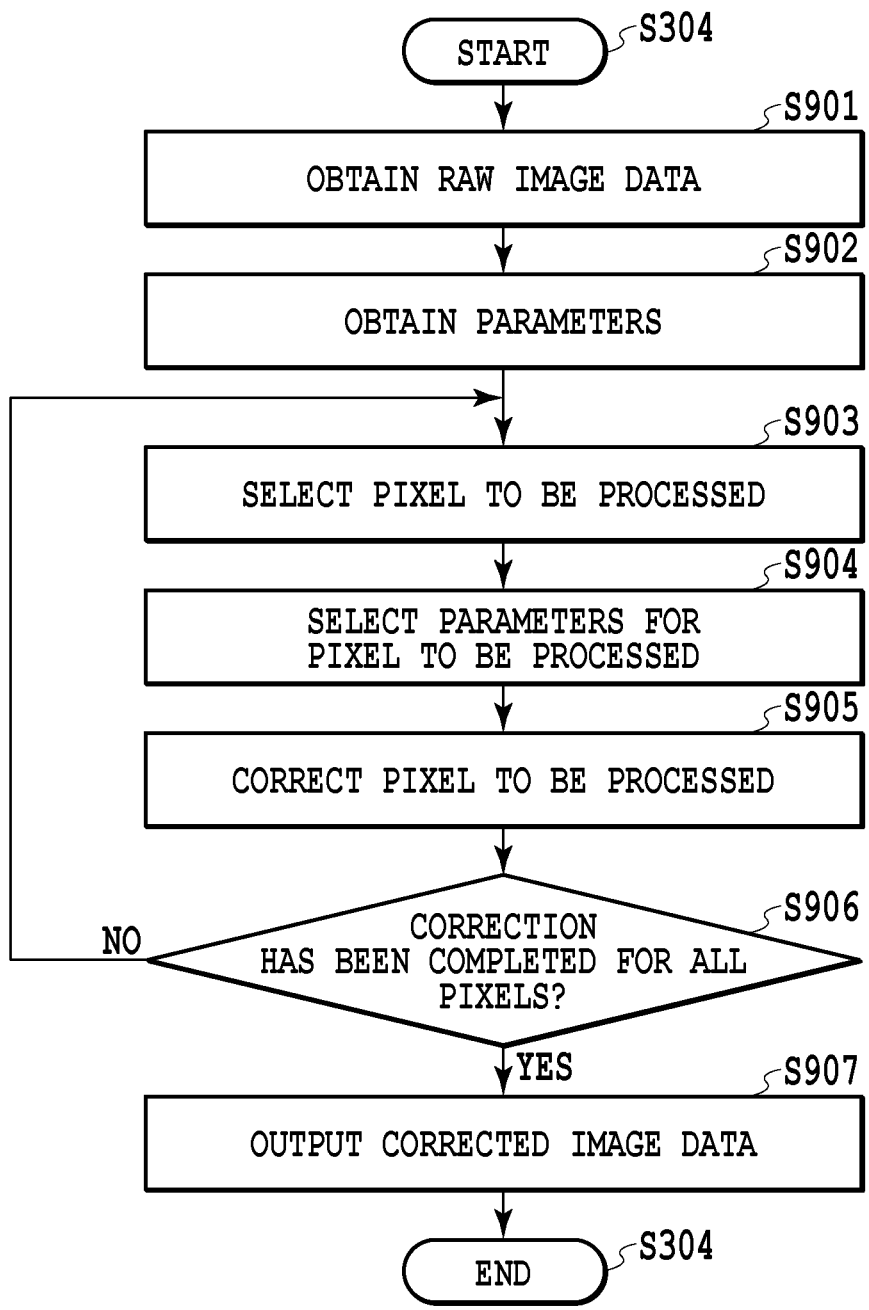
FIG. 9 is a flowchart diagram showing an example of a flow of correction processing according to Embodiment 1 of the present invention.

With reference to a flowchart in FIG. 9, details of the correction processing in Step S304 described in FIG. 2 are given below.

In Step S901, the correction processing unit 204 obtains the RAW image data inputted in Step S301.

In Step S902, the correction processing unit 204 obtains the parameters determined in Step S303.

In Step S903, the correction processing unit 204 selects an unprocessed pixel from the RAW image data obtained in S901.

In Step S904, the correction processing unit 204 selects, from the parameters obtained in Step S902, parameters corresponding to the pixel selected in Step S903.

In Step S905, using the parameters selected in Step S904, the correction processing unit 204 corrects the pixel selected in Step S903. Specifically, Formulae (1) to (3) may be used.

In Step S906, the correction processing unit 204 determines whether or not the correction processing has been completed for all the pixels in the RAW image data obtained in Step S901. The correction processing unit 204 proceeds to Step S907 in a case where the correction processing has been completed for all the pixels, or proceeds to Step S903 to continue the processing in a case where the correction processing has not been completed for all the pixels yet.

In Step S907, the correction processing unit 204 outputs corrected image data generated through the correction processing in Steps S903 to S906.

By the processing described above, image data, such as RAW image data, in which each pixel has a signal value of different level can be subjected to noise reduction processing, and high-quality image data reduced in noise can thus be obtained.

Embodiment 2

In Embodiment 1, the parameters are determined for each color in the color filter information. In the method of determining the parameters for each color, pixels of the same color as the target pixel serve as its reference pixels, and therefore the target area needs to be determined such that all the pixels of the same color therein coincide with those in each reference area. In a method described in this embodiment, not all the pixels of the same color in the target area need to coincide with those in the reference area, or in other words, reference pixels are determined such that they coincide with pixels in the target area. Specifically, in the example described in Embodiment 1, reference pixels are determined first, and then pixels to be used as a target area are determined such that they correspond to the reference pixels. In an example to be described in Embodiment 2, pixels to be used as a target area are determined first, and then reference pixels corresponding to the pixels to be used as the target area are determined.

The configuration and the like of an image processing apparatus of Embodiment 2 may be the same as those described in Embodiment 1. The following description gives only points different from those in Embodiment 1, omitting points overlapping therewith.

Figure 3:
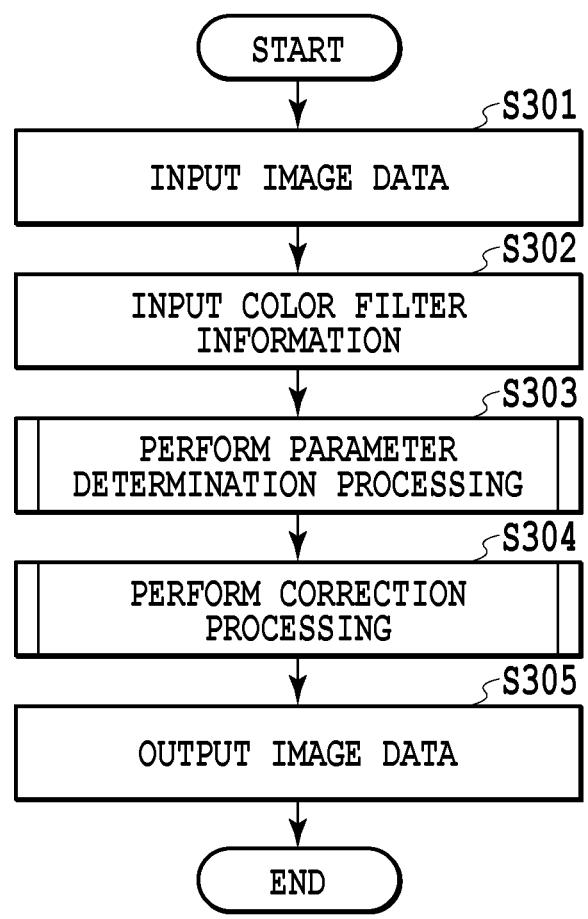
FIG. 3 is a flowchart diagram showing an example of a flow of image processing according to Embodiment 1 of the present invention.
Figure 10:
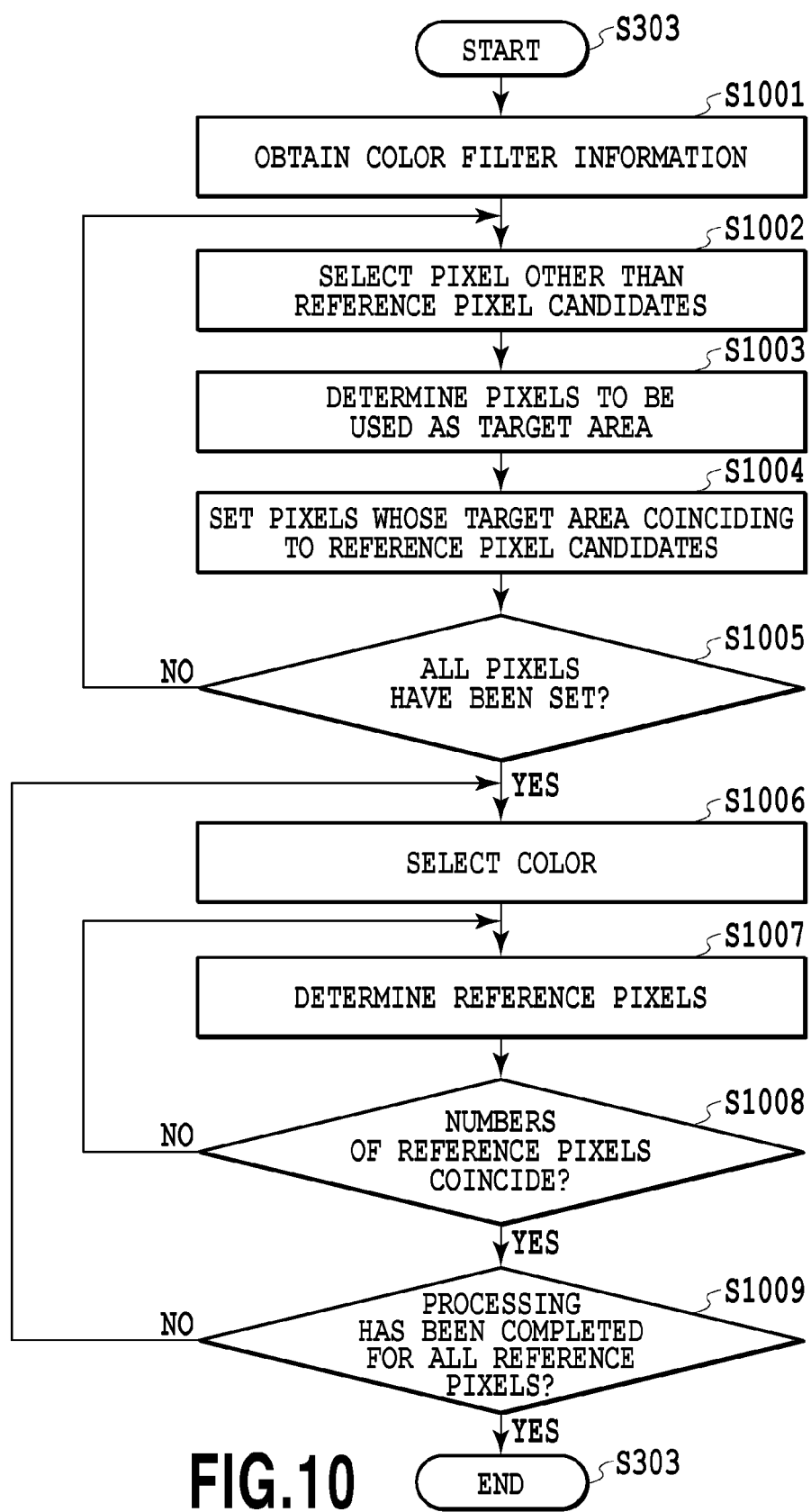
FIG. 10 is a flowchart diagram showing an example of a flow of parameter determination processing according to Embodiment 2 of the present invention.

With reference to a flowchart in FIG. 10, details of the parameter determination processing in Step S303 described in FIG. 3 are given.

In Step S1001, the parameter determination unit 203 obtains color filter information. Step S1001 is the same as Step S501.

In Step S1002, the parameter determination unit 203 selects an unprocessed pixel other than reference pixel candidates. The reference pixel candidates will be described later.

In Step S1003, the parameter determination unit 203 determines pixels to be used as a target area of the pixel selected in Step S1002.

In Step S1004, the parameter determination unit 203 sets, as a reference pixel candidate, each pixel constituting a pixel placement coinciding with that of the pixels determined in Step S1003 as being used as the target area.

In Step S1005, the parameter determination unit 203 determines whether or not all the pixels have been set as a reference pixel candidate for any target area. The parameter determination unit 203 proceeds to Step S1006 in a case where all the pixels have been set, or proceeds to Step S1002 to continue the processing in a case where all the pixels have not been set yet.

Figures 11A, 11B, 11C, 11D, 11E, 11F, 11G, 11H:
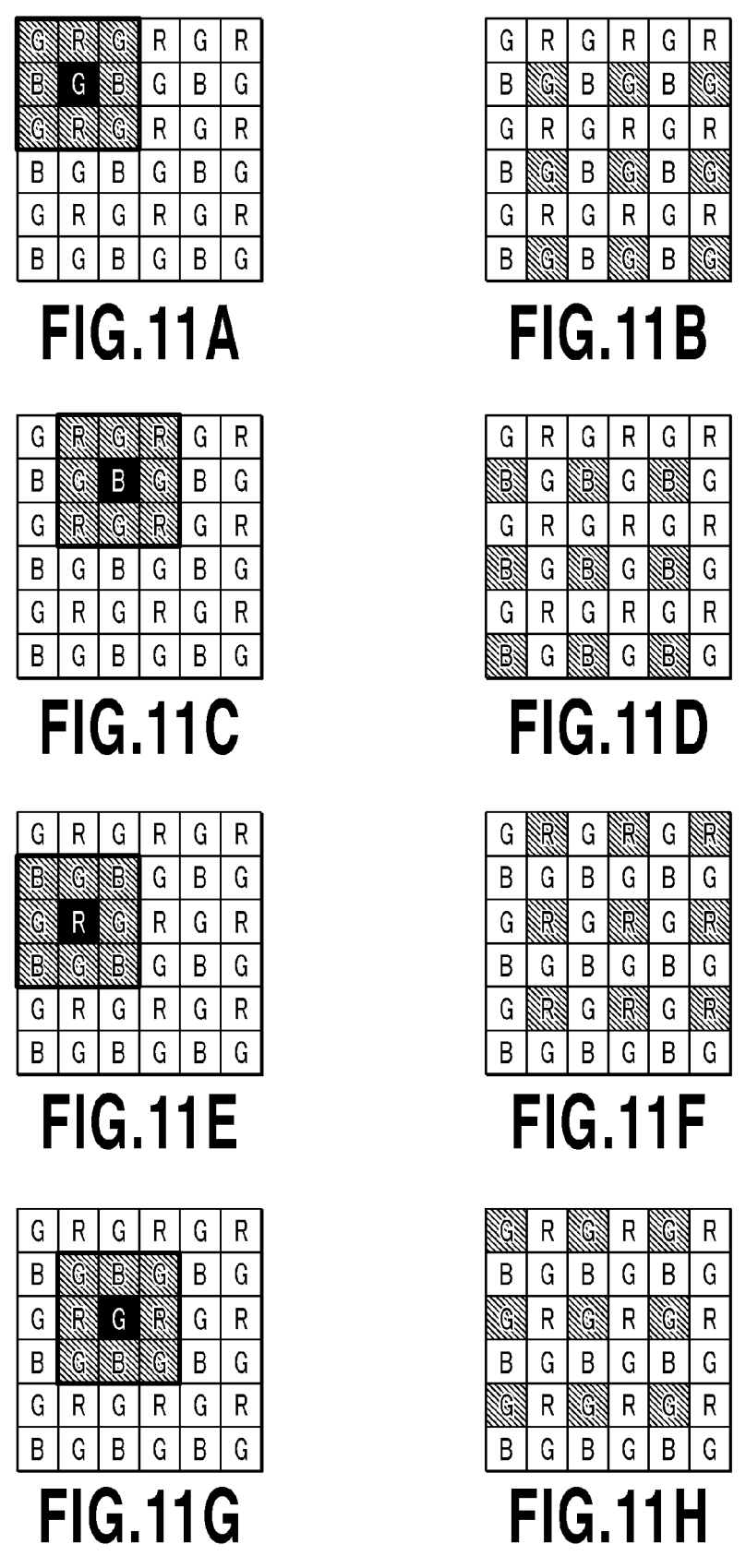

With reference to FIGS. 11A to 11H, a description is now given of how the reference pixel candidates are set in Steps S1003 to S1005. First, assume that a green (G) pixel indicated in black in FIG. 11A is selected in Step S1002. In Step S1003, the parameter determination unit 203 determines, as pixels to be used as a target area, pixels in a predetermined range from the target pixel which is the green (G) pixel shown in black in FIG. 11A. In the example shown in FIG. 11A, 3×3 pixels having the green (G) pixel as the target pixel are determined as the pixels to be used as the target area.

Next, in Step S1004, the parameter determination unit 203 sets, as reference pixel candidates, pixels constituting a pixel placement coinciding with that of the pixels to be used as the target area shown in FIG. 11A, i.e., pixels with which similarities can be calculating by use of the target area selected in FIG. 11A. In other words, the parameter determination unit 203 sets, as reference pixel candidates, pixels constituting the same pixel placement as the pixels in the target area selected in FIG. 11A. Accordingly, the reference pixel candidates corresponding to the pixels to be used as the target area in FIG. 11A are pixels in gray in FIG. 11B. Similarly, reference pixel candidates corresponding to pixels to be used as a target area shown in FIG. 11C are pixels in gray in FIG. 11D; reference pixel candidates corresponding to pixels to be used as a target area shown in FIG. 11E are pixels in gray in FIG. 11F; reference pixel candidates corresponding to pixels to be used as a target area shown in FIG. 11G are pixels in gray in FIG. 11H. In this way, Steps S1003 and S1004 are repeated until all the pixels are set as the reference pixel candidates. Thus, in this embodiment, there are four groups of reference pixel candidates corresponding to the pixels to be used as the target area: two for green, one for blue, and one for red. Although the two groups for green are for the same color, the following description assumes that the reference pixels are classified into four colors.

In Step S1006, the parameter determination unit 203 selects one of the four colors set in Steps S1002 to S1005.

In Step S1007, the parameter determination unit 203 determines reference pixels to be used to perform the correction processing on a pixel of the color selected in Step S1006.

In Step S1008, the parameter determination unit 203 determines whether or not the number of the reference pixels determined in Step S1007 coincides with the numbers of reference pixels of the other colors. The parameter determination unit 203 proceeds to Step S1009 in a case where the numbers of the reference pixels coincide, or proceeds to Step S1007 to continue the processing in a case where they do not coincide.

In Embodiment 1, the reference pixels are determined for each color such that the number of the reference pixels may be substantially the same among all the colors. In this embodiment, the reference pixels may be determined for each group of reference pixel candidates such that the number of the reference pixels may be substantially the same among the all groups of reference pixel candidates. Thus, the processing in Steps S1007 and S1008 are the same as that in Steps S503 and S504 in Embodiment 1, and is therefore not described again here.

In Step S1009, the parameter determination unit 203 determines whether or not the processing has been completed for all the reference pixel candidates set in Steps S1002 to S1005. The parameter determination unit 203 ends the processing in a case where the processing has been completed for all the reference pixel candidates, or proceeds to Step S1006 to continue the processing in a case where the processing has not been completed for all the reference pixel candidates yet.

By the processing above, in this embodiment, pixels to be used as a target area are first determined, and reference pixels are determined such that they coincide with the pixels determined to be used as the target area. Thereby, even in a case where image data has signal values of different levels on a pixel basis, the noise reduction processing can be performed on the image data, allowing high-quality image data reduced in noise to be obtained.

Embodiment 3

Figure 12:
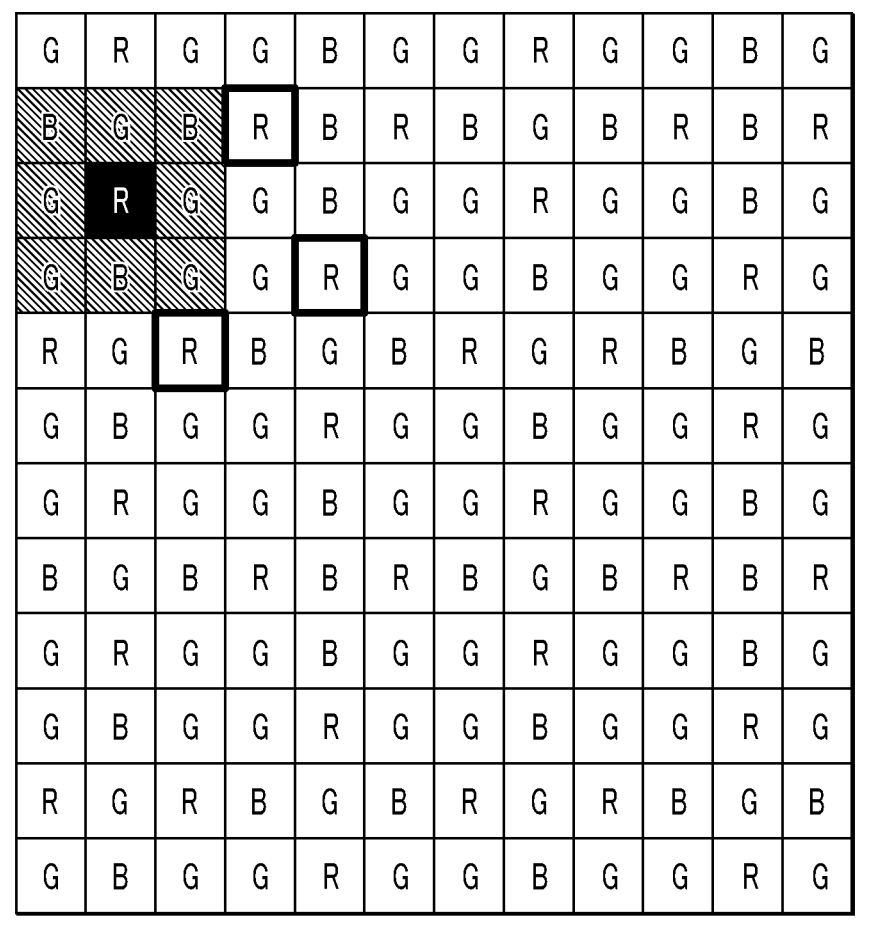

In the example described in Embodiment 2, the color filter information is a Bayer array. In a case where the color filters have high random nature, the reference pixels might become thin with respect to the target pixel, which could lower the noise reduction effect. This case of thin reference pixels is described with reference to FIG. 12. FIG. 12 shows an example of color filters having higher random nature than the Bayer array, and shows a target pixel in black and pixels used as a target area in gray. Black-edged pixels near the target pixel are pixels of the same color as the target pixel, namely red, but a target area cannot be determined uniformly by color as described in Embodiment 1. Also, Black-edged pixels are not selected as the reference pixel candidates in the method described in Embodiment 2 because the pixel placements constituted by them do not coincide with that of the target pixel. As a result, the number of reference pixels used for correction of the target pixel become small.

In a method to be described in this embodiment, in a case where the random nature of the color filters is high, the reference area is changed on a reference pixel basis and processed. In Embodiment 3, an example is described where pixels to be used as a target area and reference pixels corresponding to the target area are determined for each target pixel. In other words, determined are pixels used as a target area in image data, and reference pixels each constituting a reference area having a pixel placement at least partially corresponding to the pixel placement of the target area.

The configuration and the like of the image processing apparatus in Embodiment 3 can be the same as those described in Embodiment 1. The following description gives only points different from those in Embodiment 1 or 2, omitting points overlapping therewith.

Figure 13:
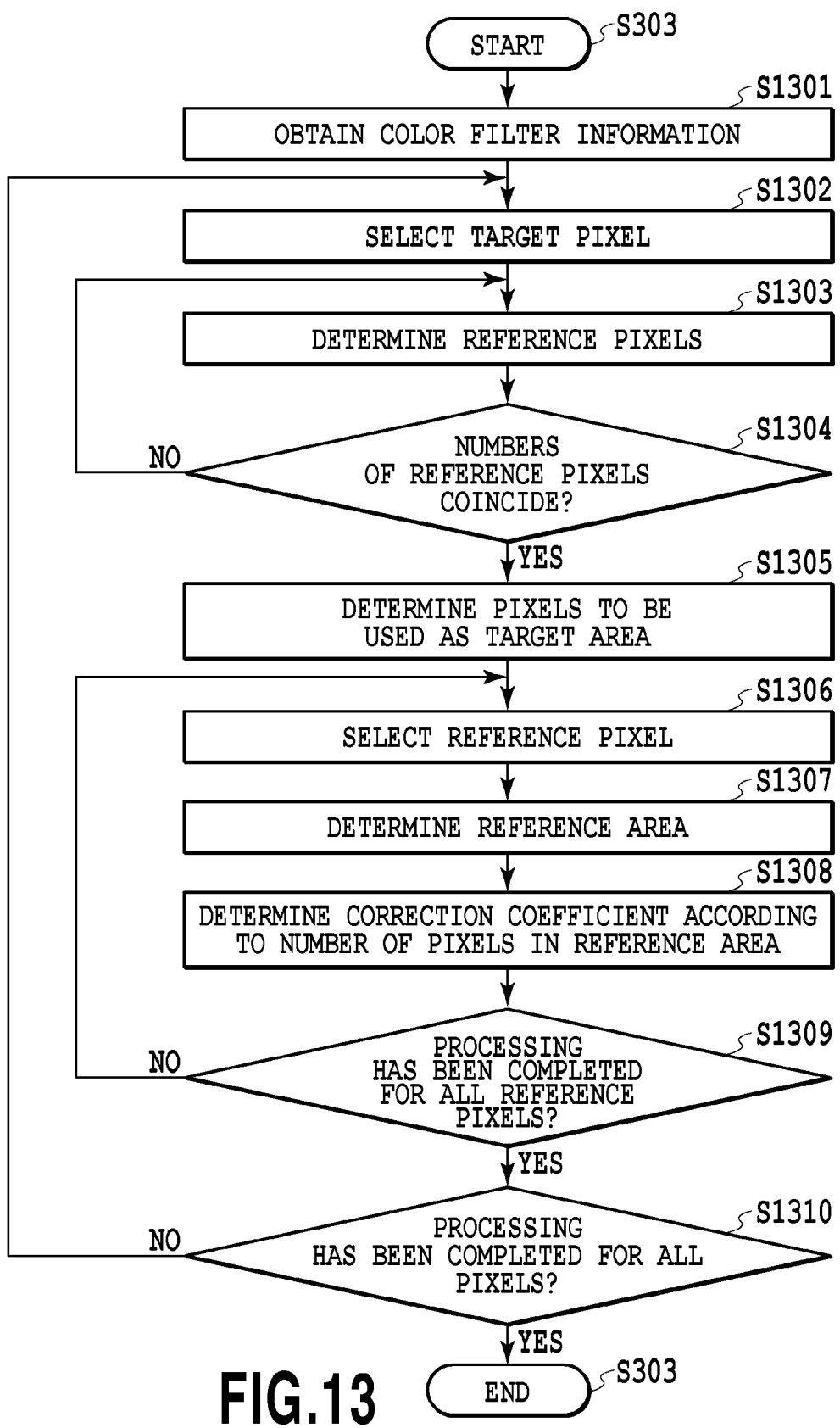
FIG. 13 is a flowchart diagram showing an example of a flow of parameter determination processing according to Embodiment 3 of the present invention.

With reference to a flowchart in FIG. 13, details of the parameter determination processing in Step S303 described in FIG. 3 are given.

In Step S1301, the parameter determination unit 203 obtains color filter information. Step S1301 is the same as Step S501.

In Step S1302, the parameter determination unit 203 selects an unprocessed pixel as a target pixel.

In Step S1303, the parameter determination unit 203 determines reference pixels. In Step S1303, pixels of the same color as that of the pixel selected in Step S1302 are determined as the reference pixels. In the example shown in FIG. 12, a red (R) pixel in black is selected as a target pixel in Step S1302. Then, in Step S1303, red pixels—the same color as the pixel selected in Step S1302—are selected as the reference pixels. In this embodiment, as an example, pixels being located near the target pixel and having the same color as the target pixel are determined as the reference pixels; however, the reference pixels may be determined in any other way.

In Step S1304, the parameter determination unit 203 determines whether the number of the reference pixels determined in Step S1303 coincides with a predetermined set value or not. The predetermined set value is, for example, a value set in advance as to how many pixels should be used as the reference pixels. The parameter determination unit 203 returns to Step S1303 in a case where it is determined in Step S1304 that the number of the reference pixels does not coincide with the predetermined set value, or proceeds to Step S1305 in a case where they coincide. As similar to Embodiments 1 and 2, the number of reference pixels does not necessarily coincide with each other between different target pixels. Namely, the numbers of reference pixels of the respective colors may substantially coincide with each other.

In Step S1305, the parameter determination unit 203 determines pixels to be used as a target area. In other words, the parameter determination unit 203 determines pixels to be used as a target area for the target pixel selected in Step S1302. In Step S1305, as in Step S1003, pixels in a predetermined range from the target pixel can be determined as pixels to be used as a target area. In the example in FIG. 12, pixels in gray are determined as the pixels to be used as the target area.

In Step S1306, the parameter determination unit 203 selects one pixel from the reference pixels determined in Step S1303. In the example in FIG. 12, one pixel is selected from the three thick-framed red (R) reference pixels.

In Step S1307, the parameter determination unit 203 determines a reference area of the pixel selected in Step S1306 (reference area determination processing).

In Step S1308, the parameter determination unit 203 determines a correction coefficient according to the number of pixels in the reference area determined in Step S1307 (correction coefficient determination processing).

Figures 14A, 14B, 14C, 14D:
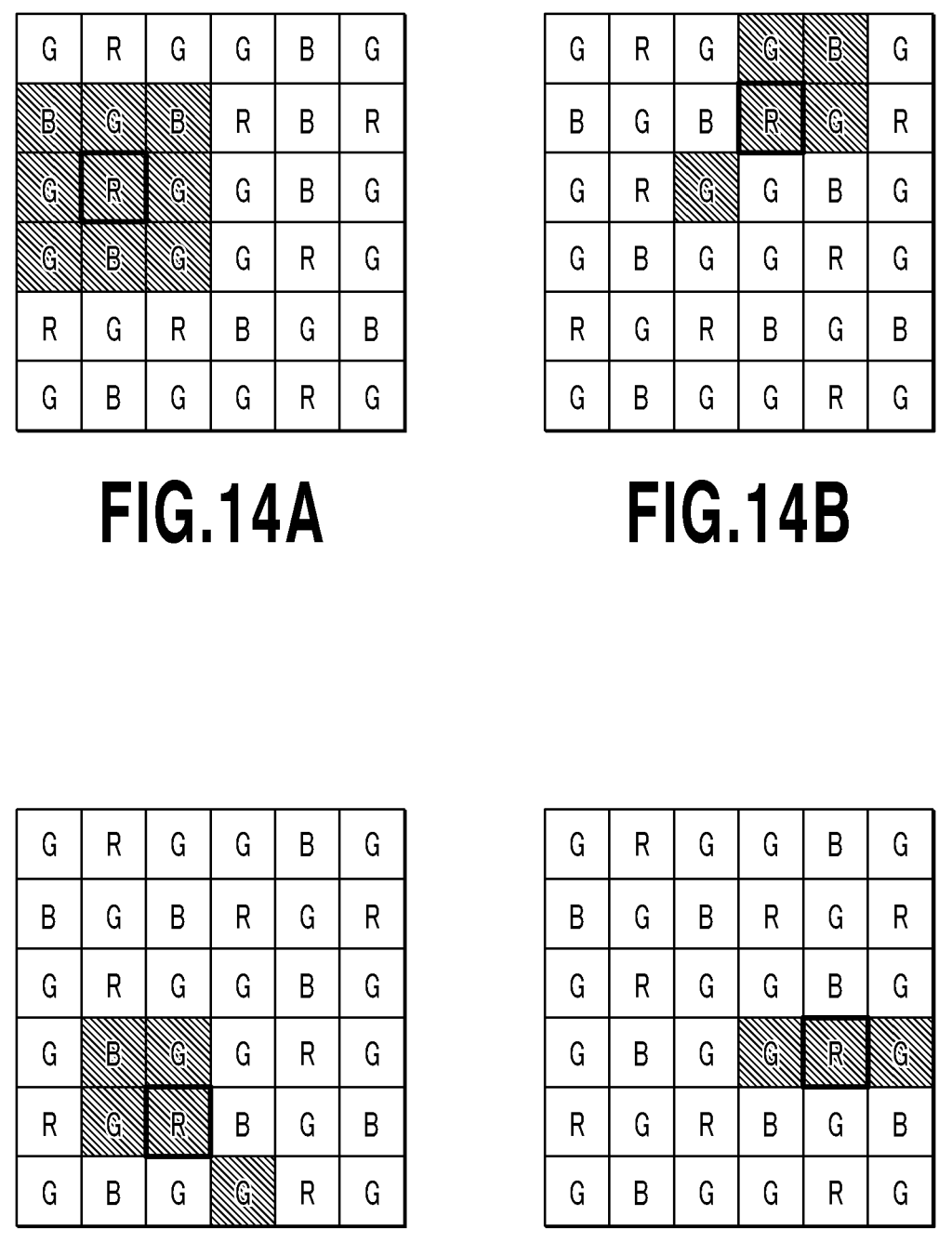

With reference to FIGS. 14A to 14D, a description is given of how the reference area and the correction coefficient are determined in Steps S1306 to S1308. Assume that the pixel selected in Step S1302 and the pixels determined in Step S1305 as being used as the target area are those shown in FIG. 12. In each of FIGS. 14A to 14D, a black-framed pixel is a reference pixel, and pixels in gray are a reference area. In a case where the reference pixel shown in FIG. 14A is selected in Step S1306, since the placement of pixels in the reference area coincides completely with that in the target area, an area having the same pixel placement as the target area is determined as the reference area. On the other hand, in a case where the reference pixel shown in FIG. 14B is selected, the target area and the reference area do not coincide in their pixel placement. Thus, in Step S1307, only pixels in gray that coincide in position with those in the target area are determined as a reference area. The same applies to cases where the reference pixels shown in FIGS. 14C and 14D are selected. Thus, the number of pixels in the reference area is nine in FIG. 14A, five in FIGS. 14B and 14C, and three in FIG. 14D. As shown in FIG. 14A to 14D, a target area and reference pixels vary by a reference pixel. However, in such a case where the numbers of pixels are different, the similarity between the target area and the reference area cannot be obtained based on Formula (2) by direct comparison between them. Thus, in Step S1308, a correction coefficient in accordance with the number of pixels in the reference area is obtained as parameters. Note that any desired method can be employed for the correction. For example, in a case where the similarity is normalized by the number of pixels in the reference area, the number of pixels in the reference area Nb is a correction value, and a similarity $C_{j'}$ after the correction is obtained as follows:

$$C'_j = \frac{C_j}{N_b} \quad (4)$$

The more the number of pixels included in the target area, the higher a reliability of the similarity of the target area and the reference area is. Thus, a correction coefficient may be determined such that the more the number of pixels included in the target area, the smaller the reliability is.

In Step S1309, the parameter determination unit 203 determines whether or not the determination on the reference correction area and the calculation of the correction coefficient have been completed for all the reference pixels. The parameter determination unit 203 proceeds to Step S1309 in a case where the determination and calculation have been completed, or proceeds to Step S1306 to continue the processing in a case where the determination and calculation have not been completed yet.

Although not shown, after Step S1307, processing may be performed in which the pixels determined in Step S1305 as being used as the target area are changed according to the reference area determined in Step S1307. For example, in a case where the reference area is determined as shown in FIG. 14B, the pixels determined in Step S1305 as being used as the target area may be changed to ones having the same pixel placement as that in the reference area.

In Step S1310, the parameter determination unit 203 determines whether the parameter determination processing has been completed for all the pixels or not. The parameter determination unit 203 ends the parameter determination processing in a case where the parameter determination processing has been completed for all the pixels, or proceeds to Step S1302 to continue the processing in a case where the parameter determination processing has not been completed for all the pixels yet. Next, correction image data is generated by applying the correction process of step S304 described in FIG. 9. In step S905, the process is the same as embodiment 1 except for an addition of correction process in which a similarity is corrected by using the formula 4.

By the processing above, the noise reduction processing can be performed even in a case where the color filters are placed randomly, allowing high-quality image data reduced in noise to be obtained.

Other Embodiments

In the examples described in Embodiments 1 to 3, image data reduced in noise is generated by inputting image data into the image processing application. Instead, processing may be performed on image data captured by the image capturing device, on image processing hardware in the image capturing device.

Further, in the examples in Embodiments 1 to 3, color filters of three colors—red, green, and blue—are used. However, the present invention is applicable to a case where the color filters are of two colors or four colors or more.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-235862, filed Oct. 25, 2012, which is hereby incorporated by reference herein in its entirety.

What is claimed is:

1. An image processing apparatus comprising:
    a determination unit configured to determine a target pixel and a pixel used as a reference pixel among pixels of a pixel array included in a predetermined area within a predetermined distance from the target pixel in RAW image data, the RAW image data having arrayed pixel values of different color components; and
    a generation unit configured to generate corrected image data by correcting a pixel value of the target pixel in the RAW image data, based on a similarity between the target pixel and each reference pixel, wherein
    the target pixel and each reference pixel have pixel values corresponding to one color component, and the pixel determined as the reference pixel by the determination unit has a pixel value of the same color component as the target pixel and the pixel array within a predetermined distance from the pixel determined as the reference pixel by the determination unit is the same pixel array within a predetermined distance from the target pixel.

2. The image processing apparatus according to claim 1, wherein the determination unit determines the target pixel and the reference pixel for each color included in a color filter.

3. The image processing apparatus according to claim 1, wherein a positional relation among pixels constituting the target pixel is equal to a positional relation among pixels constituting the reference pixel.

4. The image processing apparatus according to claim 1, wherein the generation unit corrects the pixel value of the target pixel by multiplying the reference pixel by a weight value determined based on the similarity.

5. The image processing apparatus according to claim 4, wherein the higher the similarity, the greater the weight value determined.

6. The image processing apparatus according to claim 1, wherein the array corresponds to a Bayer array.

7. The image processing apparatus according to claim 1, wherein the color filter array information is information on a random array.

8. The image processing apparatus according to claim 1, wherein the generating unit comprises a deriving unit configured to derive, for each pixel determined as the reference pixel by the determination unit, the similarity between the target pixel and the determined pixel, and wherein the deriving unit determines, for each pixel determined as the reference pixel by the determination unit, a target pixel group including the target pixel and a reference pixel group including the reference pixel, and derives the similarity based on the target pixel group and the reference pixel group.

9. The image processing apparatus according to claim 8, wherein the target pixel and the reference pixel are pixels corresponding to the same color information, and the target pixel group and the reference pixel group correspond to the same color array.

10. The image processing apparatus according to claim 1, wherein the number of pixels and a color array in the target pixel group and the reference pixel group are respectively different for each reference pixel.

11. The image processing apparatus according to claim 1, wherein the generation unit corrects the similarity according to the number of pixels of the target pixel group and the number of pixels of the reference pixel group.

12. The image processing apparatus according to claim 1, wherein the determination unit determines, as the reference pixel, the pixel having a pixel value of the same color component as the target pixel among pixels included in the predetermined area.

13. The image processing apparatus according to claim 1, wherein
the predetermined area corresponds to a rectangle area of N×N pixels, and
the determination unit determines, as the reference pixel, the target pixel and every second pixel from the target pixel having pixels values of the same color component as the target pixel among the N×N pixels.

14. The image processing apparatus according to claim 1, wherein
the predetermined area corresponds to a rectangle area of N×N pixels, and
the determination unit
determines, as a candidate of the reference pixel, the target pixel and every second pixel from the target pixel having pixels values of the same color component as the target pixel among the N×N pixels, and
determines whether each candidate of the reference pixel is used as the reference pixel according to a result of a determination whether the number of pixels of the candidate of the reference pixel is a predetermined number of pixels.

15. The image processing apparatus according to claim 1, wherein the generation unit comprises:
a deriving unit configured to derive a weight for the reference pixel based on the similarity derived by comparing a target pixel group including the target pixel with a reference pixel group including the reference pixel, and
a correction unit configured to correct the pixel value of the target pixel by performing weighted using the pixel value of the reference pixel and the weight for the reference pixel.

16. The image processing apparatus according to claim 15, wherein the deriving unit uses, as the target pixel group, a pixel group having the same relation of position as other pixel group. regardless of the color component of the target pixel.

17. An image processing method comprising the steps of:
determining a target pixel and a pixel used as a reference pixel among pixels of a pixel array included in a predetermined area within a predetermined distance from the target pixel in RAW image data, the RAW image data having arrayed pixel values of different color components; and
generating corrected image data by correcting a pixel value of the target pixel in the RAW image data, based on a similarity between the target pixel and each reference pixel, wherein
the target pixel and each reference pixel have pixel values corresponding to one color component, and
the pixel determined as the reference pixel in the determining step has a pixel value of the same color component as the target pixel and the pixel array within a predetermined distance from the pixel determined as the reference pixel in the determining step is the same pixel array within a predetermined distance from the target pixel.

18. A non-transitory computer readable storage medium storing a program which causes a computer to perform the steps of:
determining, a target pixel and a pixel used as a reference pixel among pixels of a pixel array included in a predetermined area within a predetermined distance from the target pixel in RAW image data, the RAW image data having arrayed pixel values of different color components; and
generating corrected image data by correcting a pixel value of the target pixel in the RAW image data, based on a similarity between the target pixel and the reference pixel, wherein
the target pixel and each reference pixel have pixel values corresponding to one color component, and
the pixel determined as the reference pixel in the determining step has a pixel value of the same color component as the target pixel and the pixel array within a predetermined distance from the pixel determined as the reference pixel in the determination step is the same pixel array within a predetermined distance from the target pixel.

\* \* \* \* \*